(12) United States Patent
Ooshiba et al.

(10) Patent No.: US 7,188,529 B2
(45) Date of Patent: Mar. 13, 2007

(54) DIFFERENTIAL PRESSURE MEASURING APPARATUS

(75) Inventors: Tetsuya Ooshiba, Musashino (JP); Ryo Kurosawa, Musashino (JP); Keita Akashi, Musashino (JP)

(73) Assignee: Yokogawa Electric Corporation, Tokyo (JP)

( * ) Notice: Subject to any disclaimer, the term of this patent is extended or adjusted under 35 U.S.C. 154(b) by 52 days.

(21) Appl. No.: 11/042,238

(22) Filed: Jan. 25, 2005

(65) Prior Publication Data

US 2006/0162460 A1 Jul. 27, 2006

(51) Int. Cl.
*G01L 13/02* (2006.01)
(52) U.S. Cl. .............. 73/716; 73/715; 73/753
(58) Field of Classification Search .......... 73/700–756; 361/283.1–283.4
See application file for complete search history.

(56) References Cited

U.S. PATENT DOCUMENTS

| | | | | |
|---|---|---|---|---|
| 3,308,411 A | * | 3/1967 | Roshala | 336/30 |
| 3,722,373 A | * | 3/1973 | Beach et al. | 92/97 |
| 4,072,057 A | * | 2/1978 | Yasuhara et al. | 73/718 |
| 4,173,149 A | * | 11/1979 | Critten et al. | 73/706 |
| 4,507,972 A | * | 4/1985 | Morita | 73/708 |
| 4,546,653 A | * | 10/1985 | Tobita et al. | 73/720 |
| 4,782,703 A | * | 11/1988 | Nishi | 73/708 |
| 6,471,016 B1 | * | 10/2002 | Nagy et al. | 188/72.4 |
| 6,796,185 B2 | * | 9/2004 | Kurosawa et al. | 73/716 |

FOREIGN PATENT DOCUMENTS

| | | | |
|---|---|---|---|
| JP | 60-181642 | | 12/1985 |
| JP | 03150437 A | * | 6/1991 |
| JP | 2004-093237 | | 3/2004 |
| JP | 2004-117086 | | 4/2004 |
| JP | 2004354128 A | * | 12/2004 |

* cited by examiner

*Primary Examiner*—Edward Lefkowitz
*Assistant Examiner*—Jermaine Jenkins
(74) *Attorney, Agent, or Firm*—John J. Penny, Jr.; Edwards Angell Palmer & Dodge LLP

(57) ABSTRACT

It is related to the shape of a back surface formed to allow a pre-loading diaphragm to become deformed at a threshold pressure value. A differential pressure measuring apparatus has the pre-loading diaphragm which becomes deformed to prevent sensors from being broken when pressure higher than a threshold pressure value is applied, wherein only convex parts of the pre-loading diaphragm are in close contact with convex parts of the back surface of a body respectively.

15 Claims, 7 Drawing Sheets

DIFFERENTIAL PRESSURE MEASURING APPARATUS

BACKGROUND OF THE INVENTION

1. Field of the Invention

The invention relates to a configuration of a back surface of a body in a differential pressure measuring apparatus having a pre-loading diaphragm. The invention also relates to the differential pressure measuring apparatus having the pre-loading diaphragm.

2. Description of the Related Art

JP-UM-A-S60-181642 (pp. 2–5, FIG. 1) is referred to as a related art of the differential pressure measuring apparatus.

FIG. 1 is an explanatory view showing the configuration of an example of a differential pressure measuring apparatus as a related art.

In FIG. 1, the reference numeral 1 designates a body. The body 1 includes a columnar neck 1A and a block-like pressure detection assembly 1B connected by welding to a welding part 1C in the outer circumferential edge portion of an end portion of the neck 1A. In this case, each of the neck 1A and the pressure detection assembly 1B is made of a stainless steel material.

A high pressure-side flange 2 and a low pressure-side flange 3 are fixed to the opposite sides of the body 1 by welding or the like. A high pressure-side induction hole 4 for high-pressure fluid with high pressure-side pressure PH to be measured and a low pressure-side induction hole 5 for low-pressure fluid with low pressure-side pressure PL to be measured are provided in the flanges 2 and 3 respectively.

A pressure measurement room 6 is formed in the body 1. A center diaphragm 7 and a silicone diaphragm 8 are provided in the pressure measurement room 6.

The center diaphragm 7 and the silicone diaphragm 8 are fixed to walls of the pressure measurement room 6 separately so that the pressure measurement room 6 is divided into two by the center diaphragm 7 and the silicone diaphragm 8.

Back surfaces 6A and 6B are formed in walls of the pressure measurement room 6 opposite to each other with respect to the center diaphragm 7. The center diaphragm 7 is welded to the body 1 at its circumferential edge portion.

The silicone diaphragm 8 as a whole is made of a monocrystalline silicon substrate.

Impurities such as boron are selectively diffused into one surface of the silicon substrate so as to form four strain gauges 80, while the other surface of the silicon substrate is machined and etched so as to form a concave diaphragm 8 as a whole.

When the silicone diaphragm 8 bends due to a differential pressure $\Delta P$ applied thereto, two of the four strain gauges 80 are expanded and the other two are compressed. These four strain gauges 80 are connected to a Wheatstone bridge circuit so that a change in resistance is detected as a change in the differential pressure $\Delta P$.

By the silicone diaphragm 8, the neck 1A is divided into two sensor rooms 81 and 82.

The silicone diaphragm 8 is bonded and fixed to an end surface of a sensor holding 9 on the pressure measurement room 6 side by a method such as connection using low-melting glass.

High pressure-side and low pressure-side conducting rooms 10 and 11 are formed between the body 1 and the high pressure-side flange 2 and between the body 1 and the low pressure-side flange 3, respectively.

High pressure-side and low pressure-side seal diaphragms 12 and 13 are provided in the high pressure-side and low pressure-side conducting rooms 10 and 11 respectively. Back surfaces 10A and 11A each having a similar shape to that of the corresponding seal diaphragm 12, 13 are formed in walls of the body 1 opposite to the seal diaphragms 12 and 13.

High pressure-side and low pressure-side seal diaphragm rooms 12A and 13A are formed between the seal diaphragm 12 and the high pressure-side back surface 10A and between the seal diagram 13 and the low pressure-side back surface 11A, respectively.

The seal diaphragms 12 and 13 are welded to the pressure detection assembly 1B at their circumferential edge portions by seal rings 121 and 131.

In this case, each of the seal diaphragms 12 and 13 and the seal rings 121 and 131 is made of a stainless steel material.

The seal diaphragm rooms 12A and 13A are made to communicate with the pressure measurement room 6 through conducting holes 14 and 15 respectively.

The seal diaphragm rooms 12A and 13A are filled with oils 101 and 102 such as silicone oils so that the oils 101 and 102 reach the upper and lower surfaces of the silicone diaphragm 8 through high pressure-side and low pressure-side oil transfer holes 16 and 17.

The oils 101 and 102 divided into two by the center diaphragm 7 and the silicone diaphragm 8 are arranged so that the amounts of the oils 101 and 102 are substantially equal to each other.

In the aforementioned configuration, when pressure acts from the high pressure side, the pressure applied to the high pressure-side seal diaphragm 12 is transmitted to the silicone diaphragm 8 by the oil 101.

On the other hand, when pressure acts from the low pressure side, the pressure applied to the low pressure-side seal diaphragm 13 is transmitted to the silicone diaphragm 8 by the oil 102.

As a result, the silicone diaphragm 8 is deformed in accordance with a difference between the pressure on the high pressure side and the pressure on the low pressure side. The deformation amount of the silicone diaphragm 8 is electrically extracted by the strain gauges 80. In this manner, differential pressure is measured.

"$f(\phi)$" expressing the characteristic of an excluded volume "$\Delta V$" of the diaphragm with respect to the pressure "P" applied thereto is used as a characteristic index of the center diaphragm 7 used in the differential pressure measuring apparatus as an example in the related art shown in FIG. 1.

A linear relation having a gradient as constant as possible in a measured pressure range is requested as the characteristic.

A differential pressure gauge using the center diaphragm 7 with such an ideal characteristic can obtain an output signal from a sensor in proportion to process pressure. Therefore, a measurement error can be reduced to the utmost even if a high-order item of a high-order equation for signal conversion in an amplifier and arithmetic operation for correction in a CPU is omitted.

That is, the differential pressure measuring apparatus in a three-diaphragm system used heretofore, that is, constituted by three diaphragms in total (i.e. two high/low pressure-side seal diaphragms 12 and 13 in contact with the process sides and one center diaphragm 7) has a structure that the center diaphragm 7 moves to any one of the opposite sides by the process pressure.

As a result, it is necessary to obtain a constant linear characteristic "f(φ)" in a wide range where the diaphragm 7 can move to any one of the opposite sides.

In order to obtain such characteristics, a solution by increasing the outer diameter of the center diaphragm 7 or by reducing the thickness of the center diaphragm 7 is effective.

However, the reduced thickness results in increase of generated stress. The solution by increasing the outer diameter of the center diaphragm 7 is mainly used.

In the differential pressure measuring apparatus using the three-diaphragm system, when overpressure is applied to the high pressure-side or low pressure-side seal diaphragm 12 or 13, the seal diaphragm applied with the overpressure is brought into close contact with the body 1.

In this manner, the structure is made such that the oil 101, 102 does not move and no pressure is transmitted to the sensors 80 so that overpressure is not transmitted to the sensors 80.

When a pre-loading type center diaphragm having a load given thereto in advance is used as the center diaphragm 7 in the three-diaphragm system described in the related art, stress generated on the center diaphragm 7 is increased so that a high-strength material has to be used as the material of the center diaphragm 7.

Ductility has to be secured in the material per se so as to mold the material as the diaphragm. When the stress generated on the center diaphragm 7 used in the differential pressure measuring apparatus is increased, the center diaphragm 7 per se has to be made of a non-ductile strong material.

From the above description, the material of the center diaphragm 7 used in the related art has to be a high-strength material which is hard and not ductile. However, it is difficult to mold the high-strength material as the center diaphragm 7. It is therefore difficult to solve the antithetic problems.

Accordingly, an improvement of the wavy shape of the center diaphragm is required. That is, the center diaphragm is improved to be shaped so as to increase an excluded volume, which is a differential volume between a volume in the initial state of the center diaphragm and a displaced volume at the time of applying pressure to the center diaphragm, in spite of small stress.

SUMMARY OF THE INVENTION

The object of the invention is to provide a differential pressure measuring apparatus having a back surface shaped so that a pre-loading diaphragm become deformed at a threshold pressure value without suffering any influence of a variation in the shape of the pre-loading diaphragm and a deformation process at the time of welding.

The invention provides a differential pressure measuring apparatus having: a body having a back surface being in a wavy shape on a side of the body; a back surface being in a wavy shape and provided in a side surface of a body; and a pre-loading diaphragm being in a wavy shape and attached to the back surface by pressing the pre-loading diaphragm to the back surface, wherein the back surface is formed to have convex parts in contact with convex parts of the pre-loading diaphragm, and concave parts opposed to concave parts of the pre-loading diaphragm, and a clearance is provided between at least one concave part of the back surface and a concave part of the pre-loading diaphragm opposed to the concave part of the back surface in a state where the pre-loading diaphragm is attached to the back surface.

Furthermore, a radius of curvature of each convex part of the back surface is smaller than a radius of curvature of each convex part of the pre-loading diaphragm corresponding to the convex part of the back surface.

Furthermore, a clearance is provided between an outermost concave part of the back surface and a concave part of the pre-loading diaphragm corresponding to the outermost concave part.

Furthermore, the pre-loading diaphragm is shaped with a plurality of waves whose height differentials are respectively different, and a clearance is provided between a concave part having small height differentials of the pre-loading diaphragm and a concave part of the back surface corresponding to the concave part having small height differentials.

Furthermore, the clearance is provided to extend from the outermost concave part of the back surface to an outermost slope part of the back surface.

The invention also provides a differential pressure measuring apparatus having: a body having a back surface being in a wavy shape on a side of the body; and a pre-loading diaphragm being in a wavy shape and that becomes deformed when a pressure higher than a threshold pressure value is applied, wherein only convex parts of the pre-loading diaphragm are in close contact with convex parts of the back surface respectively in a state where the pre-loading diaphragm is attached to the back surface.

Furthermore, a radius of curvature of each convex part of each back surface is smaller than a radius of curvature of each convex part of the pre-loading diaphragm corresponding to the convex part of the back surface.

Furthermore, a clearance is provided between an outermost concave part of the back surface and a concave part of the pre-loading diaphragm corresponding to the outermost concave part.

Furthermore, the pre-loading diaphragm is shaped with a plurality of waves whose height differentials are respectively different, and a clearance is provided between a concave part having small height differentials of the pre-loading diaphragm and a concave part of the back surface corresponding to the concave part having small height differentials.

Furthermore, the pre-loading diaphragm is formed in a convex shape, and pressed against the back surface by a predetermined pressing force so as to be attached to the back surface.

The invention also provides a differential pressure measuring apparatus having: a body having a back surface being in a wavy shape on a side of the body; and a pre-loading diaphragm being in a wavy shape and that comes to be deformed when a pressure higher than a threshold pressure value is applied, wherein the pre-loading diaphragm is formed in a convex shape, and pressed against the back surface by a predetermined pressing force so as to be attached to the back surface.

Furthermore, the pre-loading diaphragm is formed so that a shape of the pre-loading diaphragm always keeps a convex shape in a state where the pressure higher than the threshold pressure value is applied.

Furthermore, the pre-loading diaphragm has at least one set of a convex part and a concave part.

Furthermore, the pre-loading diaphragm has an outer flat part in an outer circumferential portion thereof.

Furthermore, the back surface includes a high pressure-side back surface of a high pressure-side seal diaphragm room and a low pressure-side back surface of a low pressure-side seal diaphragm room, and the pre-loading diaphragm includes a high pressure-side pre-loading diaphragm covering the high pressure-side back surface, forming a low pressure-side overpressure room with the high pressure-side back surface, and made to communicate with a high pressure-side conducting hole in a position outside an outer circumferential end of the high pressure-side pre-loading diaphragm, and a low pressure-side pre-loading diaphragm covering the low pressure-side back surface, forming a high pressure-side overpressure room with the low pressure-side back surface, and made to communicate with a low pressure-side conducting hole in a position outside an outer circumferential end of the low pressure-side pre-loading diaphragm, and the differential pressure measuring apparatus further comprising:

a low pressure-side overpressure conducting hole having one end made to communicate with the low pressure-side overpressure and the other end made to communicate with the low pressure-side conducting hole; and a high pressure-side overpressure conducting hole having one end made to communicate with the high pressure-side overpressure and the other end made to communicate with the high pressure-side conducting hole.

DETAILED DESCRIPTION OF THE PREFERRED EMBODIMENTS

Figure 2:
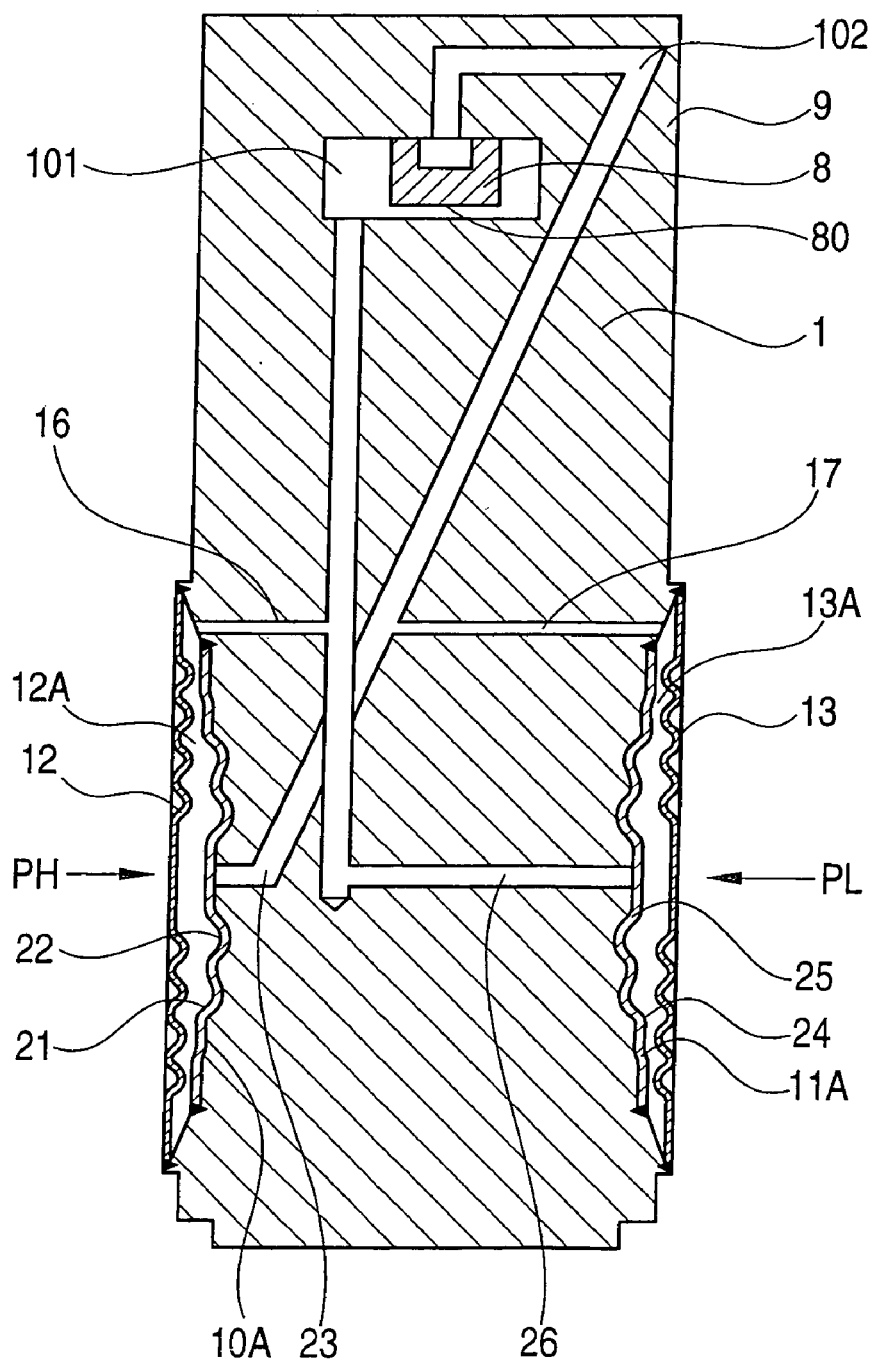
FIG. 2 is an explanatory view showing the configuration of a prior application by the present inventor.

FIG. 2 is an explanatory view showing the configuration of a prior application by the inventors of the present application, disclosed in JP-A-2004-117086 titled "DIFFERENTIAL PRESSURE MEASURING APPARATUS" and filed on Sep. 25, 2002 to Japanese Patent Office.

Figure 3:
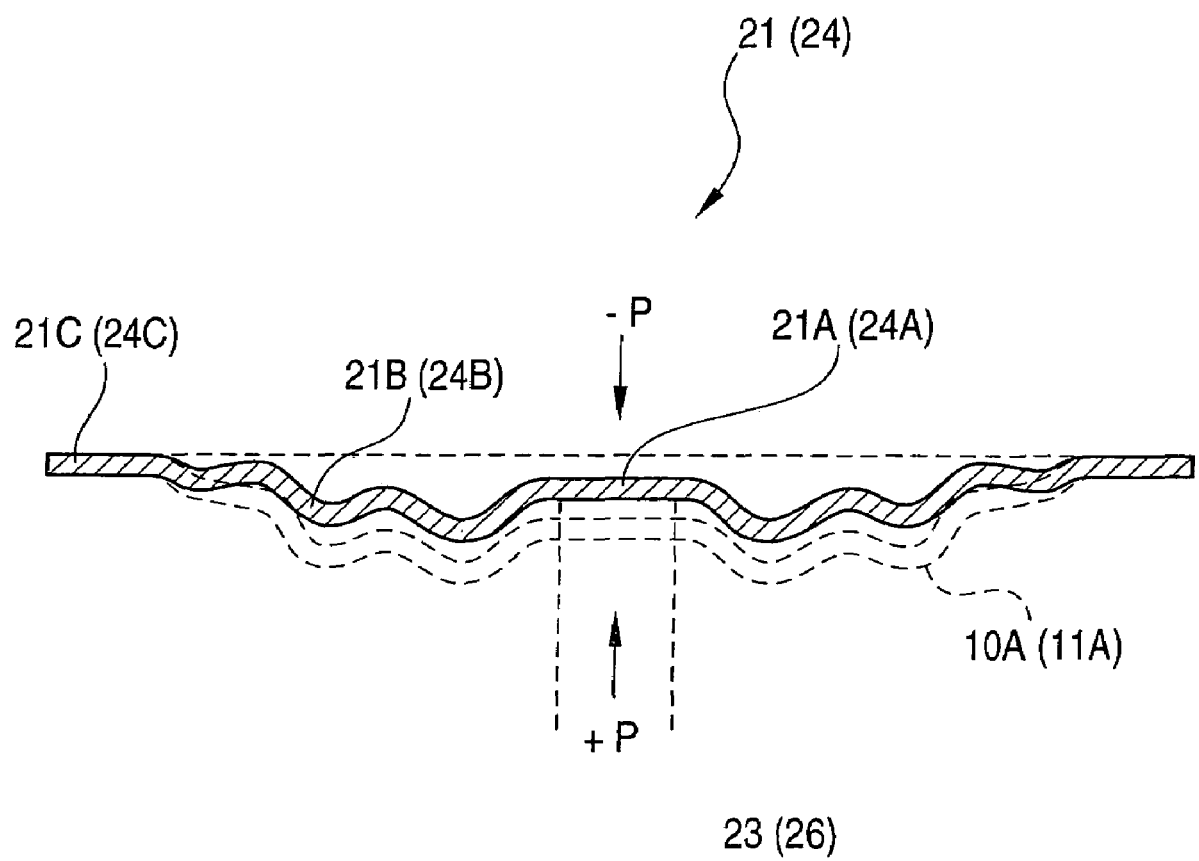
FIG. 3 is an explanatory view showing parts depicted in FIG. 2.
Figure 4:
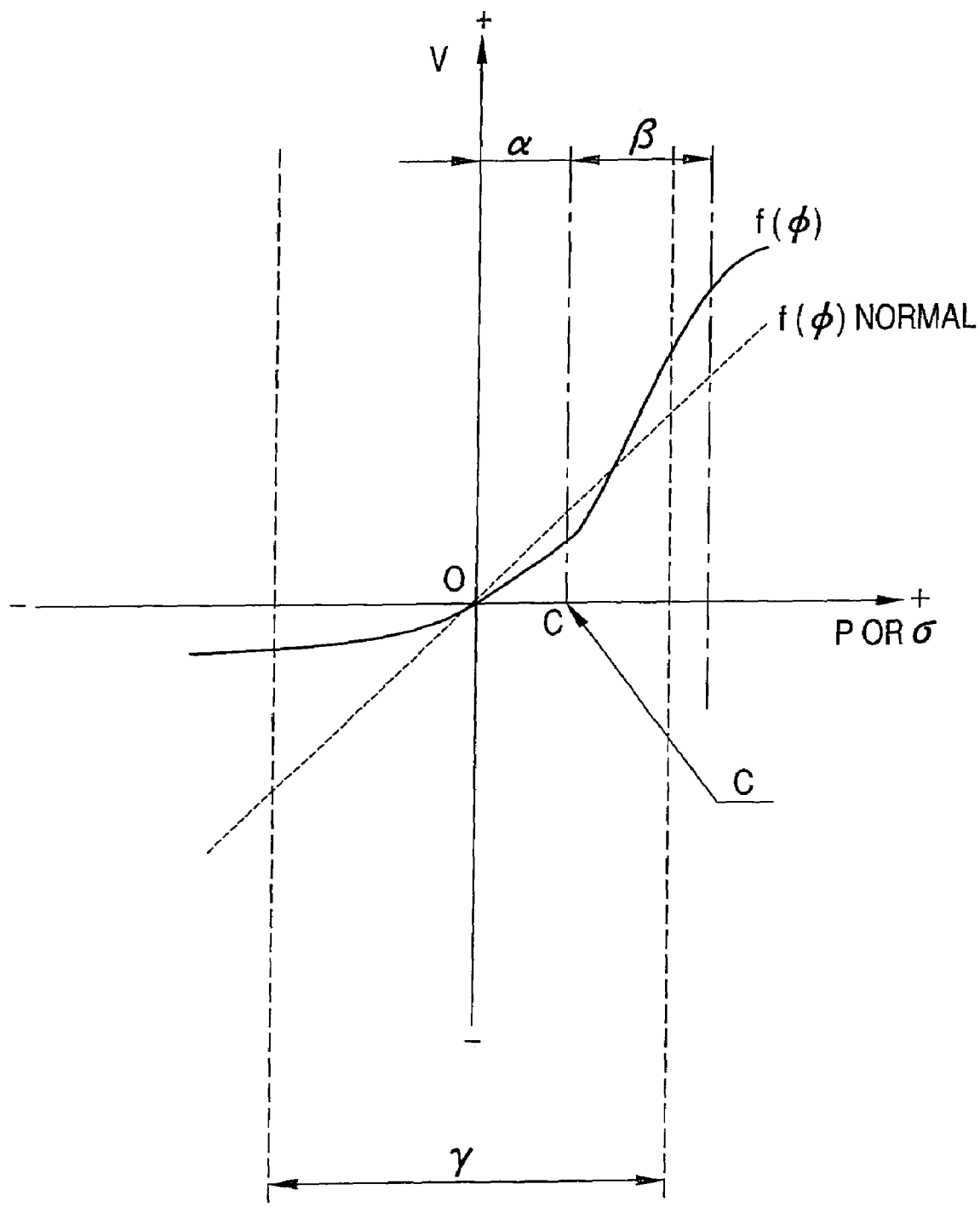
FIG. 4 is an explanatory view showing operation of FIG. 2.
Figure 5:
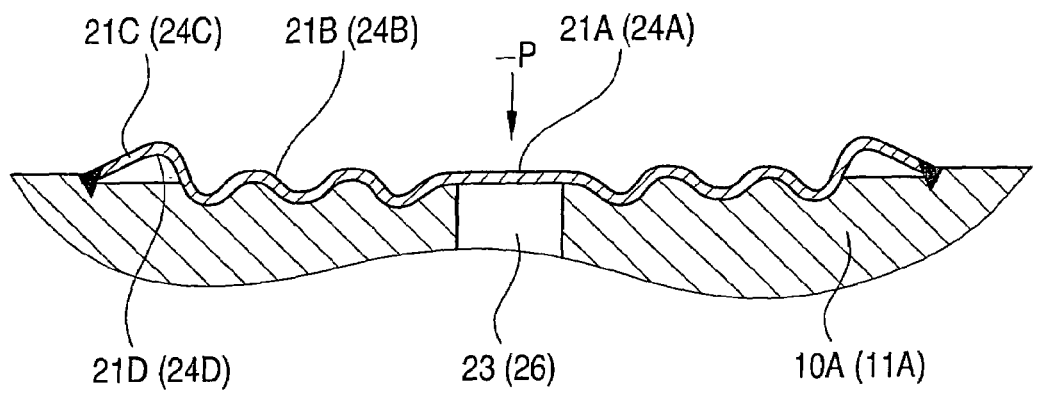
FIG. 5 is an explanatory view showing assembling in FIG. 2.

FIG. 3 is an explanatory view showing parts depicted in FIG. 2. FIG. 4 is an explanatory view showing operation of FIG. 2. FIG. 5 is an explanatory view showing assembling in FIG. 2.

In the drawings, the reference numeral 21 designates a high pressure-side pre-loading diaphragm. The high pressure-side pre-loading diaphragm 21 is provided to cover a high pressure-side back surface 10A of a high pressure-side seal diaphragm room 12A. A low pressure-side overpressure 22 is formed between the high pressure-side pre-loading diaphragm 21 and the high pressure-side back surface 10A.

As shown in the drawings, the high pressure-side pre-loading diaphragm 21 is formed into a predetermined wavy shape. The convex side of the high pressure-side pre-loading diaphragm 21 comes into contact with the back surface 10A so as to be pressed against the back surface 10A by a predetermined pressing force. Thus, the convex side of the high pressure-side pre-loading diaphragm 21 is attached to the back surface 10A.

The reference numeral 23 designates a low pressure-side overpressure conducting hole. The low pressure-side overpressure conducting hole 23 is provided in a body 1 and has one end made to communicate with the low pressure-side overpressure 22 and the other end made to communicate with a low pressure-side conducting hole 17.

In this case, the one end of the low pressure-side overpressure conducting hole 23 is provided in a position opposite to the center of the high pressure-side pre-loading diaphragm 21.

Incidentally, a high pressure-side conducting hole 16 is made to communicate with the high pressure-side seal diaphragm room 12A in a position outside the outer circumferential end of the high pressure-side pre-loading diaphragm 21.

The reference numeral 24 designates a low pressure-side pre-loading diaphragm. The low pressure-side pre-loading diaphragm 24 is provided to cover a low pressure-side back surface 11A of a low pressure-side seal diaphragm room 13A. A high pressure-side overpressure 25 is formed between the low pressure-side pre-loading diaphragm 24 and the low pressure-side back surface 11A.

As shown in FIG. 3, the low pressure-side pre-loading diaphragm 24 is formed into a predetermined wavy shape. The convex side of the low pressure-side pre-loading diaphragm 24 comes into contact with the back surface 11A so as to be pressed against the back surface 11A by a predetermined pressing force. Thus, the convex side of the low pressure-side pre-loading diaphragm 24 is attached to the back surface 11A.

The reference numeral 26 designates a high pressure-side overpressure conducting hole. The high pressure-side overpressure conducting hole 26 is provided in the body 1 and has one end made to communicate with the high pressure-side overpressure 25 and the other end made to communicate with the high pressure-side conducting hole 16.

In this case, the one end of the high pressure-side overpressure conducting hole 26 is provided in a position opposite to the center of the low pressure-side pre-loading diaphragm 24.

Incidentally, the low pressure-side conducting hole 17 is made to communicate with the low pressure-side seal diaphragm room 13A in a position outside the outer circumferential end of the low pressure-side pre-loading diaphragm 24.

As shown in FIG. 3, the high pressure-side pre-loading diaphragm 21 (low pressure-side pre-loading diaphragm 24) is shaped like a disc, including a center flat part 21A (24A), corrugated parts 21B (24B), and an outer flat part 21C (24C). The center flat part 21A (24A) is formed in the center portion of the pre-loading diaphragm 21 (24). The corrugated parts 21B (24B) are provided outside the center flat part 21A (24A) so as to surround the center flat part 21A (24A). The outer flat part 21C (24C) is provided outside the corrugated parts 21B (24B) so as to surround the corrugated parts 21B (24B). The pre-loading diaphragm 21 (24) as a whole is formed into a predetermined convex shape in advance.

As shown in FIG. 3, the convex side of the pre-loading diaphragm 21 (24) comes into contact with the back surface 10A (11A) so as to be pressed against the back surface 10A (11A) by a predetermined pressing force. Thus, the convex side of the pre-loading diaphragm 21 (24) is attached to the back surface 10A (11A).

The high pressure-side pre-loading diaphragm 21 (low pressure-side pre-loading diaphragm 24) which has not yet been pressed and attached is indicated by the broken lines in FIG. 3.

Incidentally, although the number of the corrugated parts 21B (24B) is two in the embodiment, it will go well if the number of the corrugated parts 21B (24B) is one or more.

In the aforementioned configuration, the high pressure-side pre-loading diaphragm 21 (low pressure-side pre-loading diaphragm 24) is a diaphragm operating only when overpressure is applied to the pre-loading diaphragm 21 (24). The high pressure-side pre-loading diaphragm 21 (low pressure-side pre-loading diaphragm 24) is assembled to be always in close contact with the body 1 when the pressure does not reach the overpressure.

That is, in comparison with the initial state, only one of the pre-loading diaphragms 21 and 24 operates.

Accordingly, it will go well if only one of the pre-loading diaphragms 21 and 24 can obtain a large excluded volume by a low pressure.

The surface of the pre-loading diaphragm 21 (24) coming into close contact with the back surface 10A (11A) is formed into the predetermined convex shape. Accordingly, in response to positive-side pressure (+P) from the high pressure-side overpressure conducting hole 23 (low pressure-side overpressure conducting hole 26), the pre-loading diaphragm 21 (24) can obtain a large excluded volume (large displaced volume which is a difference between the volume in the initial state and the volume at the time of application of the pressure) by a low pressure, compared with a normal diaphragm.

In response to negative-side pressure (−P), the pre-loading diaphragm 21 (24) cannot obtain a large excluded volume compared with the normal diaphragm. This results in no problem because the pre-loading diaphragm 21 (24) is not used in such a pressure range.

When the relation between the per-loading diagram and the normal diaphragm is expressed by "f(φ)" and "f(φ) normal" each indicating the relation between the excluded volume and the pressure as shown in FIG. 4, the per-loading diagram exhibits the following characteristic. That is, when the pressure is applied (+P) to the per-loading diagram, the excluded volume per unit pressure obtained by the per-loading diagram at pressure higher than pre-loading setting pressure C is larger than that at pressure not higher than the pre-loading setting pressure C.

That is, when overpressure not lower than the pre-loading setting pressure C is applied, the pre-loading diaphragm 21 (24) is deformed suddenly so as to absorb the overpressure.

Incidentally, it is necessary that the pre-loading setting pressure C operating in response to the overpressure can be set desirably in accordance with the pressure range used in the differential pressure measuring apparatus.

To satisfy this necessity, there may be used a method of changing the thickness of the pre-loading diaphragm 21 (24) so as to relax stress generated on the pre-loading diaphragm 21 (24). The pre-loading diaphragm 21 (24) is shaped to always have a convex shape at the pre-loading setting pressure C even when the pre-loading setting pressure C is changed. As a result, the characteristic shown in FIG. 4 can be obtained.

Here, in FIG. 4, the sign α designates a pre-loading range; β, a pre-loading diaphragm system operating range; and γ, a three-diaphragm system normal operating range.

As a result, (1) the pre-loading diaphragm 21 (24) formed into a predetermined convex shape is used, so that a large excluded volume can be obtained even at low pressure. Accordingly, the pre-loading diaphragm 21 (24) per se can be designed to be compact.

In addition, it is not necessary to use a high-strength material as the material of the pre-loading diaphragm so that a manufacturing process for the pre-loading diaphragm can be simplified. Accordingly, it is possible to obtain differential pressure measuring apparatus which can be reduced in manufacturing cost.

(2) Normally, welding etc. is used as the method for joining the pre-loading diaphragm 21 (24) to the body 1.

Due to the outer flat part 21C (24C) provided in the outer circumferential portion of the convex pre-loading diaphragm 21 (24), the pre-loading diaphragm 21 (24) can be fixed and positioned easily at the time of welding etc. Accordingly, it is possible to obtain differential pressure measuring apparatus in which the pre-loading diaphragm 21 (24) can be fixed uniformly and firmly by welding etc.

(3) Even when the same pressure is applied to the diaphragm, a part of the diaphragm where the largest stress is generated varies according to the shape of the diaphragm. Accordingly, the diaphragm has to be designed to prevent the largest stress from appearing in a structurally weak part of the diaphragm such as the welding part.

At least one corrugated part 21B (24B) is provided in the pre-loading diaphragm 21 (24), so that it is possible to generate the largest stress in the structurally strong part, while it is possible to avoid concentration of the stress so as to disperse the generated stress.

Accordingly, it is possible to obtain differential pressure measuring apparatus high in reliability against stress generated repeatedly.

Due to the provision of the corrugated part 21B (24B), flowability of oil becomes good. Accordingly, it is possible to obtain differential pressure measuring apparatus good in response.

(4) The pre-loading diaphragm 21 (24) is designed to keep its convex shape even after the pre-loading diaphragm 21 (24) is pressed against and attached to the back surface 10A (11A). Accordingly, the pre-loading diaphragm 21 (24) formed to be convex exhibits a characteristic in which a gentle gradient is once sharpened and then gentled again.

The point where the gradient is sharpened, that is, the pre-loading setting pressure is present in the condition that the pre-loading diaphragm formed to be convex keeps its convex shape.

Accordingly, since the pre-loading diaphragm still has a convex shape after pressed against and attached to the back surface, there is a point where the excluded volume increases suddenly. Accordingly, it is possible to obtain differential pressure measuring apparatus excellent in protection from overpressure.

That is, the pre-loading diaphragms used in the differential pressure measuring apparatus are beforehand pressed against and welded to the back surfaces machined into shapes approximate to the pre-loading diaphragm shapes corresponding to threshold pressure values set individually within respective ranges of the differential pressure measuring apparatus.

Each pre-loading diaphragm is used in the condition that the pre-loading diaphragm is in close contact with the back surface.

The pre-loading diaphragm manufactured thus is not deformed when pressure not higher than the threshold pressure value is applied. The pre-loading diaphragm is deformed only when pressure higher than the threshold pressure value (overpressure) is applied.

In this structure, since no oil is moved when the diaphragm is used in a pressure range not higher than the threshold pressure value, good responsiveness can be obtained.

On the other hand, when the overpressure is applied, the diaphragm is deformed (in the elastic range) so as to increase the excluded volume. In this manner, it is possible to prevent the sensors from being broken.

When pre-loading diaphragms having such characteristics are applied to differential pressure measuring apparatus, the pre-loading diaphragms used are used in close contact with back surfaces.

Each pre-loading diaphragm is manufactured in the process of molding, trimming and heat treatment. Due to the corrugated shape of the pre-loading diaphragm, it is impossible to avoid a variation in the shape.

When there is a slight variation in the shape of the pre-loading diaphragm or the shape of the back surface, it is difficult to bring the whole surface of the pre-loading diaphragm into close contact with the back surface. Accordingly, the pre-loading diaphragm except parts in close contact with the back surface will rise from the back surface.

Such an incompletely close contact state may result in a situation that the pre-loading diaphragm starts to deform even though the pre-loading diaphragm is used in a pressure range not higher than the threshold pressure value, or a situation that the pre-loading diaphragm does not start to deform even though the pressure is higher than the threshold pressure value.

When the pre-loading diaphragm starts to deform at pressure not higher than the setting pressure value, the response speed which is one of the characteristics of the pre-loading diaphragm is spoiled.

On the other hand, if the pre-loading diaphragm does not start to deform in spite of the pressure higher than the threshold pressure value, the effect of protection from overpressure is reduced.

As described above, in the incompletely close contact state, it is possible to make good use of the characteristic of the pre-loading diaphragm.

In order to make the pre-loading diaphragm start to deform at the threshold pressure value, the pre-loading diaphragm has to be compulsorily deformed from its natural shape after molding to a shape corresponding to the threshold pressure value before welding in the welding process for welding and fixing the pre-loading diaphragm to the back surface. With respect to this point, it is difficult to bring the pre-loading diaphragm and the back surface into close contact with each other.

Description will be made below in detail with reference to the drawings.

First, description will be made on the shape of a back surface B relative to a pre-loading diaphragm A at a predetermine threshold pressure value.

Figure 6:
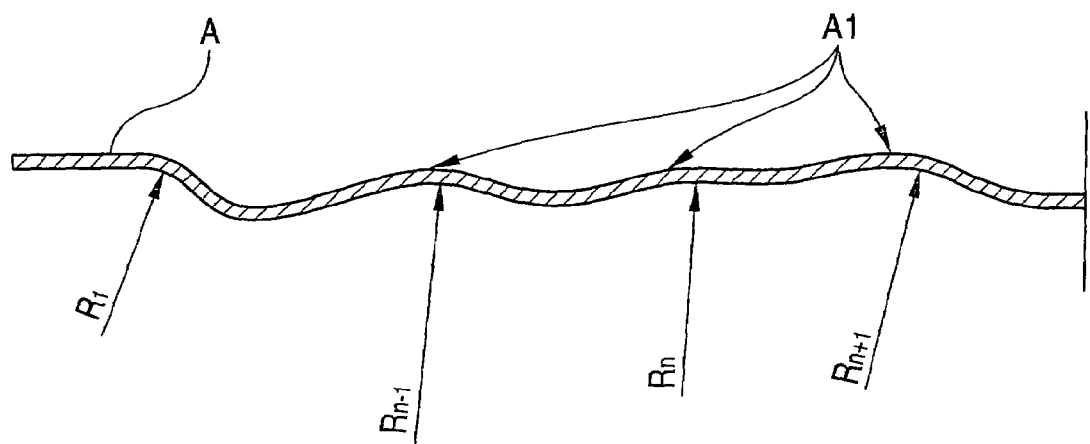
FIG. 6 is an explanatory view of a premise of the invention.

FIG. 6 shows the shape of the pre-loading diaphragm A. The pre-loading diaphragm A is formed into a wavy shape which includes convex parts A1 each having a radius Rn and concave parts smoothly continuous to the convex parts A1.

Incidentally, in order to obtain predetermined characteristic of the pre-loading diaphragm, the radii Rn may differ from one another.

Figure 7:
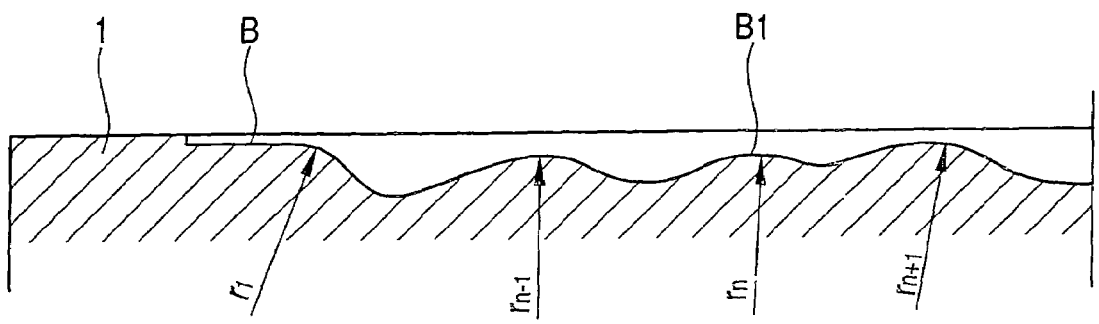
FIG. 7 is an explanatory view of the premise depicted in FIG. 6.

FIG. 7 schematically shows the back surface B. The back surface B is formed into a wavy shape which includes convex parts B1 each having a radius rn and concave parts smoothly continuous to the convex parts B1.

Figure 8:
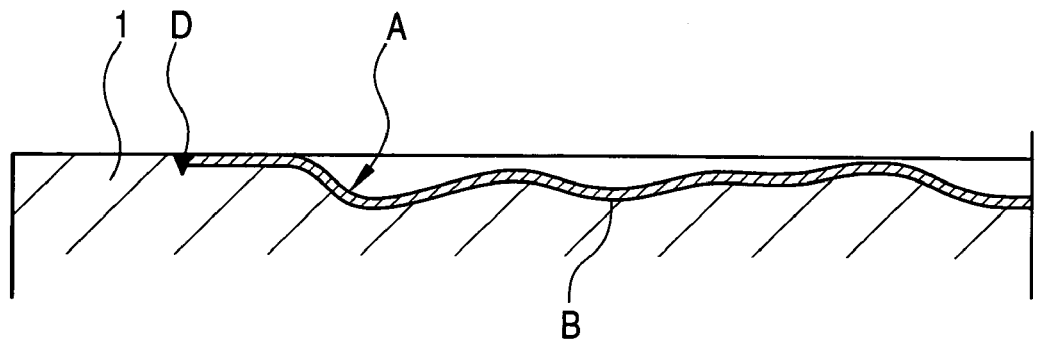
FIG. 8 is an explanatory view of the premise depicted in FIG. 6.

As shown in FIG. 8, the pre-loading diaphragm A is used in the condition that a circumferential edge of the pre-loading diaphragm A is fixedly welded to the back surface B at a welding part D.

Figure 9:
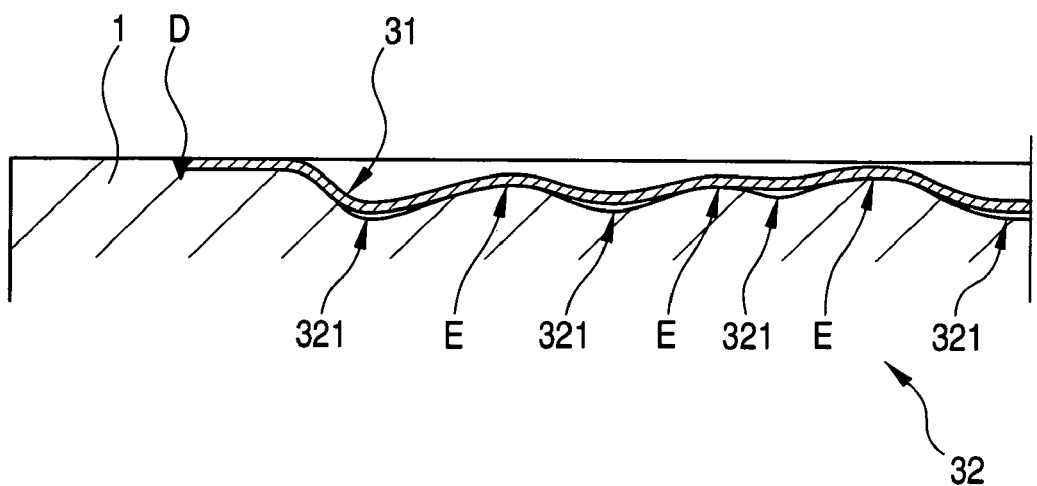
FIG. 9 shows an explanatory view showing the configuration of an embodiment of the invention.

FIG. 9 shows an explanatory view showing the configuration of a main portion according to an embodiment of the invention.

Figure 1:
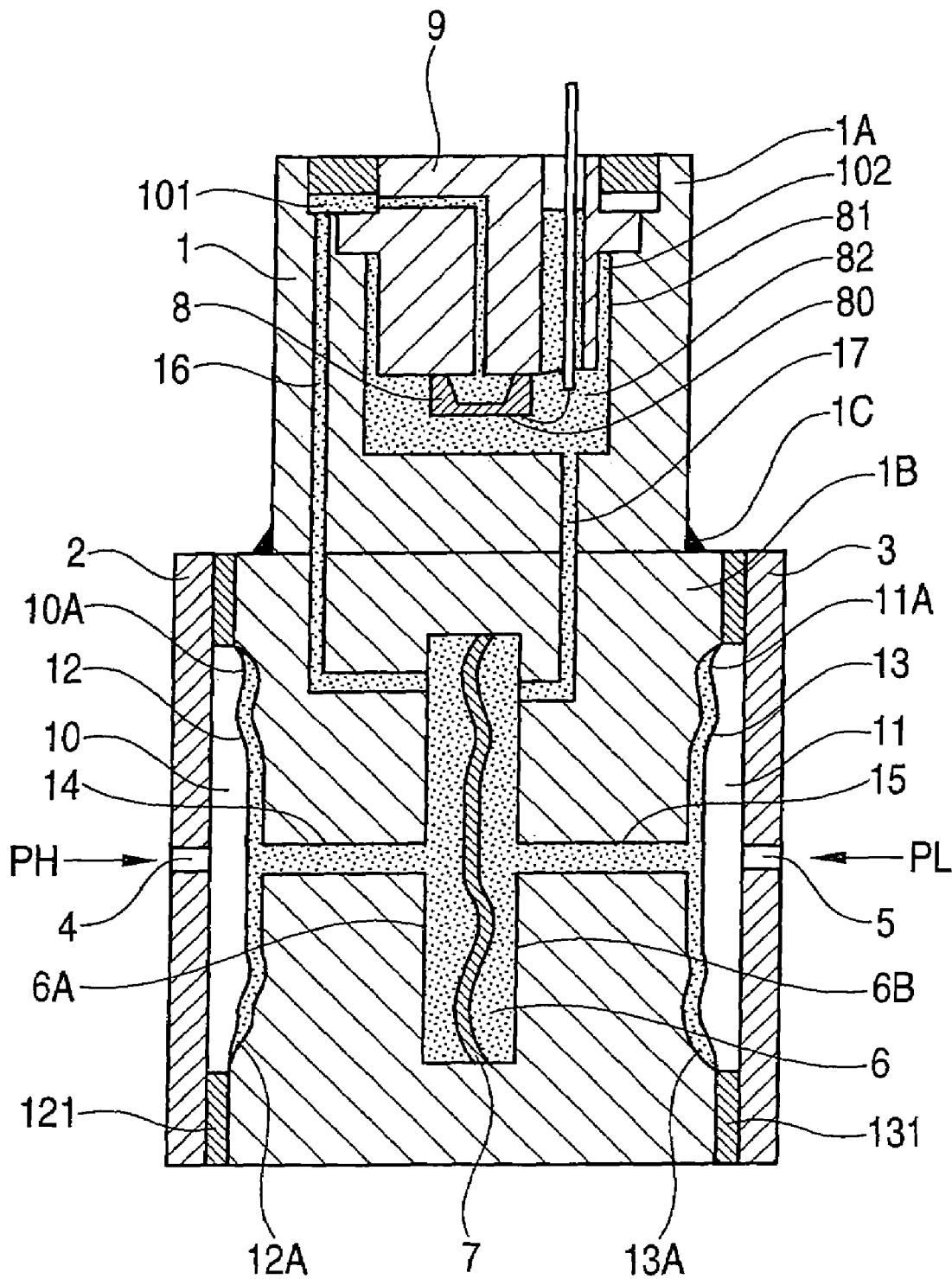
FIG. 1 is an explanatory view showing the configuration of an example of differential pressure measuring apparatus as a related art.

In FIG. 9, parts having the same functions as those in FIG. 1 are denoted by the same reference numerals correspondingly.

Description will be made below on only differences of FIG. 9 from FIG. 1.

In the embodiment, a back surface 32 is formed into such a shape that a clearance 321 will be formed between each concave part of a pre-loading diaphragm 31 and the opposite back surface 32, while the back surface 32 has close contacts E with the pre-loading diaphragm in their convex parts having a relation in which in terms of the relation between the radius Rn of the convex part of the shape of the pre-loading diaphragm and the radius rn of the convex part of the back surface, the radius of curvature of the convex part of the back surface is slightly smaller than the radius of curvature of the corresponding convex part of the pre-loading diaphragm.

When the concave parts of the pre-loading diaphragm are in contact with the concave parts of the back surface, deformation using the contacts as fulcrums is generated, so that the pre-loading diaphragm is apt to rise from the back surface.

According to the embodiment, the clearance 321 provided in each concave part can absorb a variation of the pre-loading diaphragm 31 per se, so that the convex parts of the pre-loading diaphragm 31 can be surely brought into close contact with the convex parts of the back surface 32. respectively at the contacts E in response to application of pressure not higher than a threshold pressure value of pre-loading operating pressure.

The embodiment has an effect on the back surface 32 in the case where the whole wavy shape of the pre-loading diaphragm 31 is uniform and there is a small difference in height among waves in the shape.

In this embodiment, the clearances 321 are set desirably in accordance with the shape of the pre-loading diaphragm 31. As each clearance 321 is increased, the amount of the oil is increased. Accordingly, there is a possibility that the clearance 321 may give an adverse influence on the response speed or the temperature characteristic. If the clearance 321 is selected suitably, increase in the amount of the oil due to the provision of the clearance 321 can be suppressed so that it is possible to obtain a differential pressure/pressure transmitter having a small influence of increase in the amount of oil.

Figure 10:
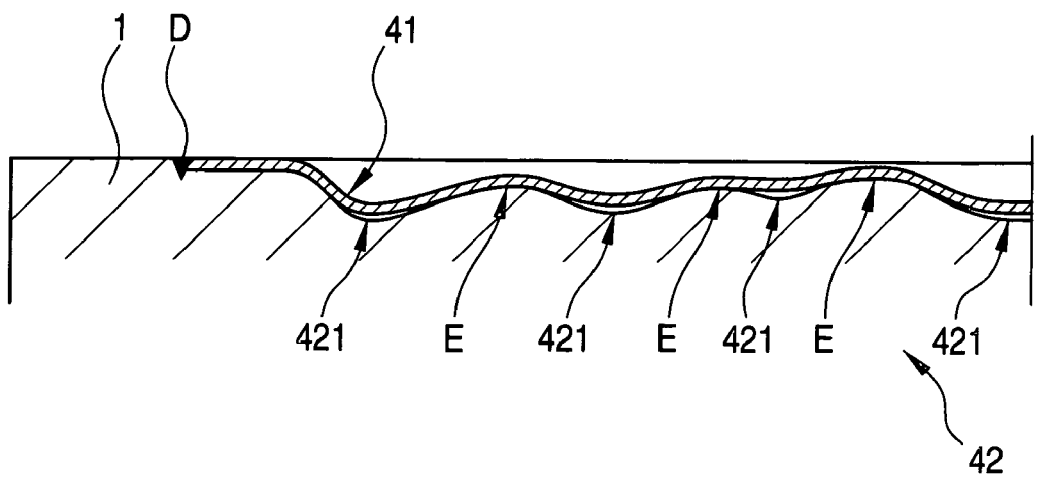
FIG. 10 shows an explanatory view showing the configuration of another embodiment of the invention.

FIG. 10 is an explanatory view showing the configuration of a main portion according to another embodiment of the invention.

In this embodiment, a back surface 42 is formed into such a shape that a clearance 421 will be formed between each concave part of a pre-loading diaphragm 41 and the opposite back surface 42, while the back surface 42 has close contacts E with the pre-loading diaphragm in their convex parts having a relation in which in terms of the relation between the radius Rn of the convex part of the shape of the pre-loading diaphragm and the radius rn of the convex part of the back surface, the radius of curvature of the convex part of the back surface is smaller than the radius of curvature of the corresponding convex part of the pre-loading diaphragm.

In the embodiment shown in FIG. 9, the wavy shape of the pre-loading diaphragm 41 as a whole is not uniform and the rigidity of the pre-loading diaphragm 41 is comparatively high, or when the radius Rn of a convex part of the pre-loading diaphragm 41 is smaller than the radius Rn of any other convex part, there is a portion where the convex part of the pre-loading diaphragm 41 is in close contact with the corresponding convex part of the back surface 42 in a larger area than any other convex part of the pre-loading diaphragm 41. Engagement in such a portion is too strong for each clearance 421 to absorb a variation of the pre-loading diaphragm 41.

In such a case, with the structure shown in FIG. 10 according to this embodiment, the pre-loading diaphragm 41 and the back surface 42 can keep the close contacts E with each other when the pressure is not higher than a threshold pressure value of pre-loading operating pressure.

Figure 11:
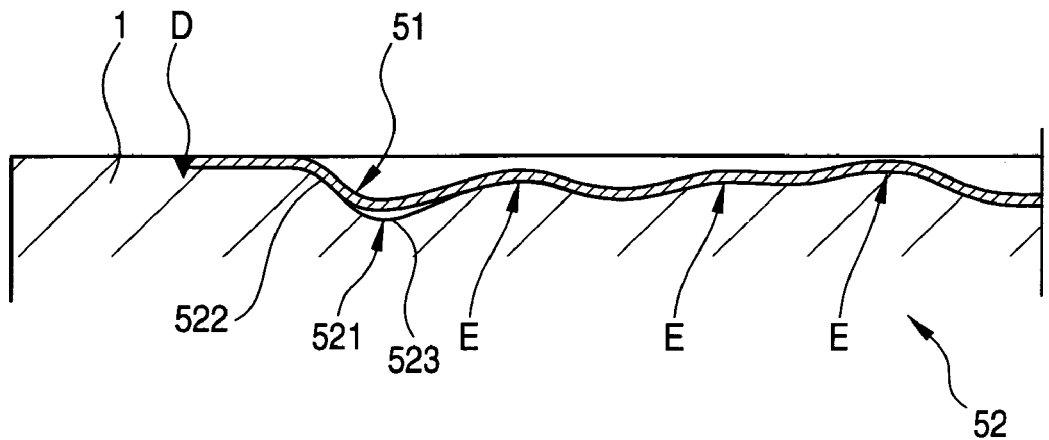
FIG. 11 shows an explanatory view showing the configuration of another embodiment of the invention.

FIG. 11 is an explanatory view showing the configuration of a main portion according to another embodiment of the invention.

In this embodiment, a back surface 52 is formed into such a shape that a clearance 521 is formed only between an outermost concave part of a pre-loading diaphragm 51 and an opposite outermost concave part of the back surface 52 while the other convex and concave parts of the pre-loading diaphragm 51 have close contacts E with the other convex and concave parts of the back surface 52 respectively.

When the pre-loading diaphragm 51 is welded to the back surface 52 at a welding part D, the pre-loading diaphragm 51 and the back surface 52 are expanded or compressed due to the influence of welding heat. The portion conspicuously suffering such a heat influence is the region ranging from an outermost slope part 522 to the outermost concave part. Accordingly, when this portion is fixed firmly at the time of welding, the heat influence on the inner side of the outmost concave part can be reduced.

This embodiment is effective in the case where the rigidity of the pre-loading diaphragm 51 is comparatively low.

Figure 12:
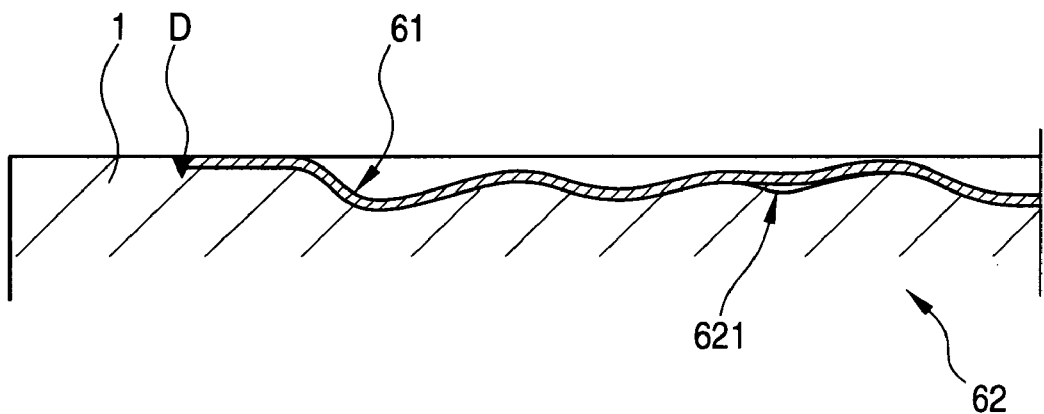
FIG. 12 shows an explanatory view showing the configuration of another embodiment of the invention.

FIG. 12 is an explanatory view showing the configuration of a main portion according to another embodiment of the invention.

In this embodiment, when portions each having a large difference in height between contiguous waves and portions each having a small difference in height between contiguous waves are mixed in a wavy shape of a pre-loading diaphragm 61, clearances 621 are formed in concave parts of a back surface 62 corresponding to the portions each having a small difference in height between the waves.

When portions each having a large difference in height between contiguous waves and portions each having a small difference in height between contiguous waves are mixed in the wavy shape of a pre-loading diaphragm 61, the close contact property in each portion having a small difference in height is more affected by machining accuracy of the back surface 62 or a variation of the pre-loading diaphragm 61 due to molding, than the close contact property in any other portion of the pre-loading diaphragm 61.

Due to the clearances 621 provided in the portions each having a small difference in height, it is possible to obtain differential pressure measuring apparatus in which rising of the pre-loading diaphragm from the back surface can be suppressed.

Figure 13:
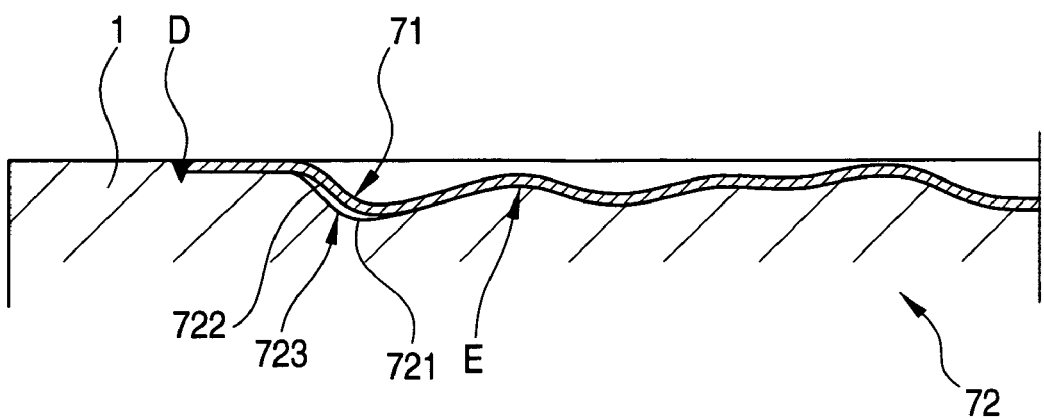
FIG. 13 shows an explanatory view showing the configuration of another embodiment of the invention.

FIG. 13 is an explanatory view showing the configuration of a main portion according to another embodiment of the invention.

In this embodiment, a clearance 723 is provided to extend from an outermost concave part 721 of a back surface 72 to an outermost slope part 722 thereof.

According to this embodiment, a variation in the shape of a pre-loading diaphragm 71 per se is absorbed by the outermost concave part 721 to thereby surely obtain pre-loading operating pressure.

When the outermost concave part 721 comes into contact with the back surface 72 earlier than any other part, the outermost concave part 721 suffers the largest influence. If the part rises after the contacting, pre-loading cannot be obtained.

This embodiment is effective in preventing such a situation.

As described above, according to the first configuration of the invention, there is the following advantage.

Due to the structure in which the pre-loading diaphragm is in contact with the back surface not wholly but only in their convex parts, clearances provided in respective concave parts can absorb a variation of the shape of the pre-loading diaphragm per se. Accordingly, it is possible to prevent the pre-loading diaphragm from rising from the back surface due to the variation in the shape of the pre-loading diaphragm.

Accordingly, it is possible to obtain differential pressure measuring apparatus which is hardly affected by the variation in the shape of the pre-loading diaphragm, so that the pre-loading operating pressure can be prevented from rising/dropping.

Moreover, when the contacts are limited to the convex parts of the pre-loading diaphragm, not only is it easy to position the pre-loading diaphragm and the back surface relatively to each other, but there is also an advantage on reducing the influence of expansion or compression caused by welding heat when the pre-loading diaphragm is fixed to the back surface by welding. Accordingly, it is possible to obtain differential pressure measuring apparatus in which the pre-loading diaphragm can be fixed by welding without spoiling of the characteristic of the pre-loading diaphragm.

According to the second configuration of the invention, there is the following advantage.

When there is a relation in which the radius of curvature of each convex part of the back surface is slightly smaller than the radius of curvature of a corresponding convex part of the pre-loading diaphragm:

It is possible to obtain differential pressure measuring apparatus suitable for the case where the wavy shape of the pre-loading diaphragm as a whole is uniform and the difference in height between continuous convex and concave parts of the pre-loading diaphragm is comparatively small.

Since a back surface having extremely small clearances can be selected particularly for a thin pre-loading diaphragm, it is possible to obtain differential pressure measuring apparatus which can have good temperature characteristic and responsiveness with a small amount of oil.

When there is a relation in which the radius of curvature of each convex part of the back surface is smaller than the radius of curvature of a corresponding convex part of the pre-loading diaphragm:

If the wavy shape of the pre-loading diaphragm as a whole is not uniform and the rigidity of the pre-loading diaphragm is comparatively high, or if the radius of each convex part of the pre-loading diaphragm is small, the engagement in the portion where the close contact area of the convex part of the pre-loading diaphragm and the corresponding convex part of the back surface is the largest will be strong, while the pre-loading diaphragm rises from the back surface in any other portion. Accordingly, it is difficult to obtain a desired pre-loading operating pressure.

To solve this problem, there may be used a back surface in which the shape of portions opposed to the convex parts of the wavy shape of the pre-loading diaphragm is formed out of circular arcs connected to each other smoothly, which arcs are smaller than circular arcs approximate to the convex parts of the wavy shape of the pre-loading diaphragm connected to each other smoothly.

When the pre-loading diaphragm and the back surface have a line contact at their convex parts, it is possible to eliminate the influence of a part of the close contact portions caused by the surface contact where the radii of the convex parts of the pre-loading diaphragm and the back surface serving as contacts therebetween are substantially equal to each other. Thus, it is possible to obtain differential pressure measuring apparatus in which the pre-loading diaphragm and the back surface can be brought into contact with each other at their convex parts equally.

According to the third configuration of the invention, there is the following advantage.

When the pre-loading diaphragm is welded to the back surface, the pre-loading diaphragm and the back surface are expanded or compressed due to welding heat. The portion conspicuously suffering such a heat influence is the portion ranging from the outermost radial part to the outermost concave part.

When a clearance is provided between the outermost concave part of the pre-loading diaphragm and the opposite outermost concave part of the back surface, the portion provided with the clearance can be fixed firmly in the welding work. Thus, it is possible to obtain differential pressure measuring apparatus in which heat influence on the inner side of the outermost convex part can be reduced.

When the rigidity of the pre-loading diaphragm is comparatively low, for example, when the pre-loading diaphragm is thin, the shape of a back surface can be selected so that all convex parts and concave parts except the outermost concave part are brought into close contact with the corresponding ones of the pre-loading diaphragm. Thus, it is possible to reduce clearances between the pre-loading diaphragm and the back surface so that it is possible to obtain differential pressure measuring apparatus in which increase in oil can be suppressed.

According to the fourth configuration, there is the following advantage.

When portions each having a large difference in height between contiguous waves and portions each having a small difference in height between contiguous waves are mixed in the shape of the pre-loading diaphragm (the wavy shape of the pre-loading diaphragm is not uniform), the close contact property in each portion having a small difference in height is more affected by machining accuracy of the back surface or a variation of the pre-loading diaphragm due to molding, than the close contact property in each portion having a large difference in height. Thus, an adverse influence may be given to the seated condition of the pre-loading diaphragm.

When clearances are provided in the portions each having a small difference in height, it is possible to obtain differential pressure measuring apparatus in which the pre-loading diaphragm can be prevented from rising from the back surface.

According to the fifth configuration of the invention, there is the following advantage.

By use of the shape of a back surface having a clearance ranging from the outermost radial part of the pre-loading diaphragm to the outermost concave part thereof, a variation in the shape of the pre-loading diaphragm per se can be absorbed by the outermost concave part. Thus, it is possible to obtain differential pressure measuring apparatus having a structure in which a desired pre-loading operating pressure can be surely obtained.

This is for the following reason. That is, when the outermost concave part of the pre-loading diaphragm comes in contact with the back surface earlier than any other part of the pre-loading diaphragm, the outermost concave part suffers the largest influence. When the outermost concave part rises after the contacting, it is impossible to obtain the pre-loading operating pressure.

What is claimed is:

1. A differential pressure measuring apparatus comprising:
    a body having a back surface being in a wavy shape on a side surface of the body; and
    a pre-loading diaphragm being in a wavy shape and attached to the back surface by pressing the pre-loading diaphragm to the back surface,
    wherein the back surface is formed to have convex parts in contact with convex parts of the pre-loading diaphragm, and concave parts opposed to concave parts of the pre-loading diaphragm, and
    a clearance is provided between at least one concave part of the back surface and a concave part of the pre-loading diaphragm opposed to the concave part of the back surface in a state where the pre-loading diaphragm is attached to the back surface.

2. The differential pressure measuring apparatus according to claim 1,
    wherein a radius of curvature of each convex part of the back surface is smaller than a radius of curvature of each convex part of the pre-loading diaphragm corresponding to the convex part of the back surface.

3. The differential pressure measuring apparatus according to claim 1,
    wherein a clearance is provided between an outermost concave part of the back surface and a concave part of the pre-loading diaphragm corresponding to the outermost concave part.

4. The differential pressure measuring apparatus according to claim 3,
    wherein the clearance is provided to extend from the outermost concave part of the back surface to an outermost slope part of the back surface.

5. The differential pressure measuring apparatus according to claim 1,
    wherein the pre-loading diaphragm is shaped with a plurality of waves whose height differentials are respectively different, and
    a clearance is provided between a concave part having small height differentials of the pre-loading diaphragm and a concave part of the back surface corresponding to the concave part having small height differentials.

6. A differential pressure measuring apparatus comprising:
    a body having a back surface being in a wavy shape on a side of the body; and a pre-loading diaphragm being in a wavy shape and that becomes deformed when a pressure higher than a threshold pressure value is applied, wherein only convex parts of the pre-loading diaphragm are in close contact with convex parts of the back surface respectively in a state where the pre-loading diaphragm is attached to the back surface.

7. The differential pressure measuring apparatus according to claim 6, wherein a radius of curvature of each convex part of each back surface is smaller than a radius of curvature of each convex part of the pre-loading diaphragm corresponding to the convex part of the back surface.

8. The differential pressure measuring apparatus according to claim 6, wherein a clearance is provided between an outermost concave part of the back surface and a concave part of the pre-loading diaphragm corresponding to the outermost concave part.

9. The differential pressure measuring apparatus according to claim 6, wherein the pre-loading diaphragm is shaped with a plurality of waves whose height differentials are respectively different, and a clearance is provided between a concave part having small height differentials of the pre-loading diaphragm and a concave part of the back surface corresponding to the concave part having small height differentials.

10. The differential pressure measuring apparatus according to claim 6, wherein the pre-loading diaphragm is formed in a convex shape, and pressed against the back surface by a predetermined pressing force so as to be attached to the back surface.

11. The differential pressure measuring apparatus according to claim 6, wherein the back surface includes a high pressure-side back surface of a high pressure-side seal diaphragm room and a low pressure-side back surface of a low pressure-side seal diaphragm room, and the pre-loading diaphragm includes a high pressure-side pre-loading diaphragm covering the high pressure-side back surface, forming a low pressure-side overpressure room with the high pressure-side back surface, and made to communicate with a high pressure-side conducting hole in a position outside an outer circumferential end of the high pressure-side pre-loading diaphragm, and a low pressure-side pre-loading diaphragm covering the low pressure-side back surface, forming a high pressure-side overpressure room with the low pressure-side back surface, and made to communicate with a low pressure-side conducting hole in a position outside an outer circumferential end of the low pressure-side pre-loading diaphragm, and the differential pressure measuring apparatus further comprising:

a low pressure-side overpressure conducting hole having one end made to communicate with the low pressure-side overpressure and the other end made to communicate with the low pressure-side conducting hole; and a high pressure-side overpressure conducting hole having one end made to communicate with the high pressure-side overpressure and the other end made to communicate with the high pressure-side conducting hole.

12. A differential pressure measuring apparatus comprising:

a body having a back surface being in a wavy shape on a side of the body; and a pre-loading diaphragm being in a wavy shape and that comes to be deformed when a pressure higher than a threshold pressure value is applied, wherein the pre-loading diaphragm is formed in a convex shape, and pressed against the back surface by a predetermined pressing force so as to be attached to the back surface wherein the back surface includes a high pressure-side back surface of a high pressure-side seal diaphragm room and a low pressure-side back surface of a low pressure-side seal diaphragm room, and the pre-loading diaphragm includes a high pressure-side pre-loading diaphragm covering the high pressure-side back surface, forming a low pressure-side overpressure room with the high pressure-side back surface, and made to communicate with a high pressure-side conducting hole in a position outside an outer circumferential end of the high pressure-side pre-loading diaphragm, and a low pressure-side pre-loading diaphragm covering the low pressure-side back surface, forming a high pressure-side overpressure room with the low pressure-side back surface, and made to communicate with a low pressure-side conducting hole in a position outside an outer circumferential end of the low pressure-side pre-loading diaphragm, and the differential pressure measuring apparatus further comprising: a low pressure-side overpressure conducting hole having one end made to communicate with the low pressure-side overpressure and the other end made to communicate with the low pressure-side conducting hole; and a high pressure-side overpressure conducting hole having one end made to communicate with the high pressure-side overpressure and the other end made to communicate with the high pressure-side conducting hole.

13. The differential pressure measuring apparatus according to claim 12, wherein the pre-loading diaphragm is formed so that a shape of the pre-loading diaphragm always keeps a convex shape in a state where a pressure higher than the threshold pressure value is applied.

14. The differential pressure measuring apparatus according to claim 12, wherein the pre-loading diaphragm has at least one set of a convex part and a concave part.

15. The differential pressure measuring apparatus according to claim 12, wherein the pre-loading diaphragm has an outer flat part in an outer circumferential portion thereof.

* * * * *